(12) United States Patent
Fastman

(10) Patent No.: US 6,295,411 B1
(45) Date of Patent: Sep. 25, 2001

(54) METHOD AND APPARATUS FOR PREVENTING SCALE BUILDUP ON ELECTRIC HEATING ELEMENTS

(75) Inventor: Gerald E. Fastman, Upper Providence, PA (US)

(73) Assignee: Electronic De-Scaling 2000, Inc., Boothwyn, PA (US)

( * ) Notice: Subject to any disclaimer, the term of this patent is extended or adjusted under 35 U.S.C. 154(b) by 0 days.

(21) Appl. No.: 08/649,222

(22) Filed: May 17, 1996

(51) Int. Cl.⁷ ........................................... F24H 1/20
(52) U.S. Cl. ............................. 392/452; 122/4 A
(58) Field of Search ........................ 392/449, 450, 392/451, 452, 453, 455, 458, 480, 481, 454; 219/628, 629, 630, 643, 687, 688, 689; 122/13.01, 4 A

(56) References Cited

U.S. PATENT DOCUMENTS

| | | | |
|---|---|---|---|
| 1,737,202 | * 11/1929 | Runnels | 122/18 |
| 1,862,120 | * 6/1932 | Northrup | 219/643 |
| 1,900,843 | * 3/1933 | Northrup | 219/643 |
| 2,652,925 | * 9/1953 | Vermeiren | 210/1.5 |
| 2,825,464 | * 4/1958 | Mack | 210/222 |
| 2,939,830 | * 6/1960 | Green et al. | 204/248 |
| 3,465,123 | * 9/1969 | Harris | 122/13.1 |
| 3,577,322 | * 5/1971 | Nesbitt et al. | 219/688 |
| 3,585,122 | * 6/1971 | King | 204/302 |
| 3,666,918 | * 5/1972 | Clark, Jr. et al. | 392/452 |
| 3,669,274 | * 6/1972 | Happ et al. | 210/42 |
| 3,680,705 | * 8/1972 | Happ et al. | 210/42 |
| 4,263,498 | * 4/1981 | Meyers | 392/451 |
| 4,326,954 | * 4/1982 | Shroyer | 210/222 |
| 4,403,137 | * 9/1983 | Glazer | 392/452 |
| 4,414,464 | * 11/1983 | Cloutier | 122/13.2 |
| 4,898,124 | * 2/1990 | Granberg et al. | 122/382 |

* cited by examiner

Primary Examiner—Jiping Lu
(74) Attorney, Agent, or Firm—Robert S. Lipton, Esq.; Lipton, Weinberger & Husick

(57) ABSTRACT

Scale buildup on the heating element of an electric water heater or industrial process boiler is minimized by directing one or more jets of incoming water or other fluid onto the heating element. Optionally the fluid is pretreated by the induced electric field of an electronic descaling unit. The pretreated water produces soft scale that can easily be removed by a jet of fluid. Preferably a series of fluid jets, from a perforated pipe, are directed at the electric heating element. Also provided is a deflection panel to redirect the jets of water back toward the heating element, thus improving the scrubbing action for removing accumulating scale.

4 Claims, 2 Drawing Sheets

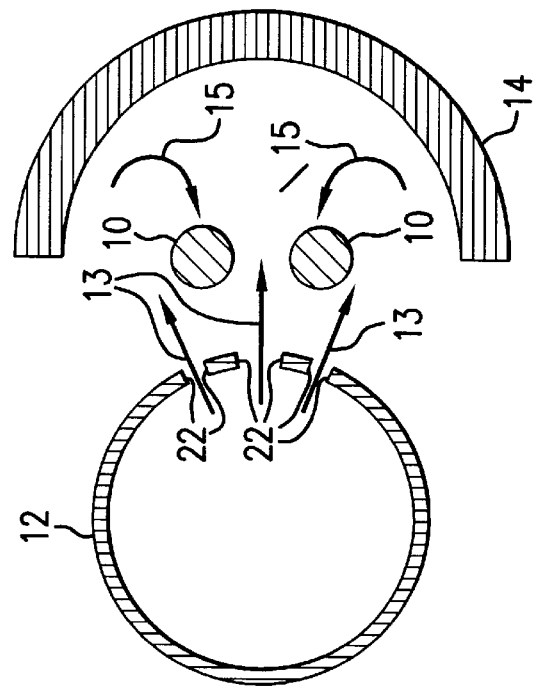
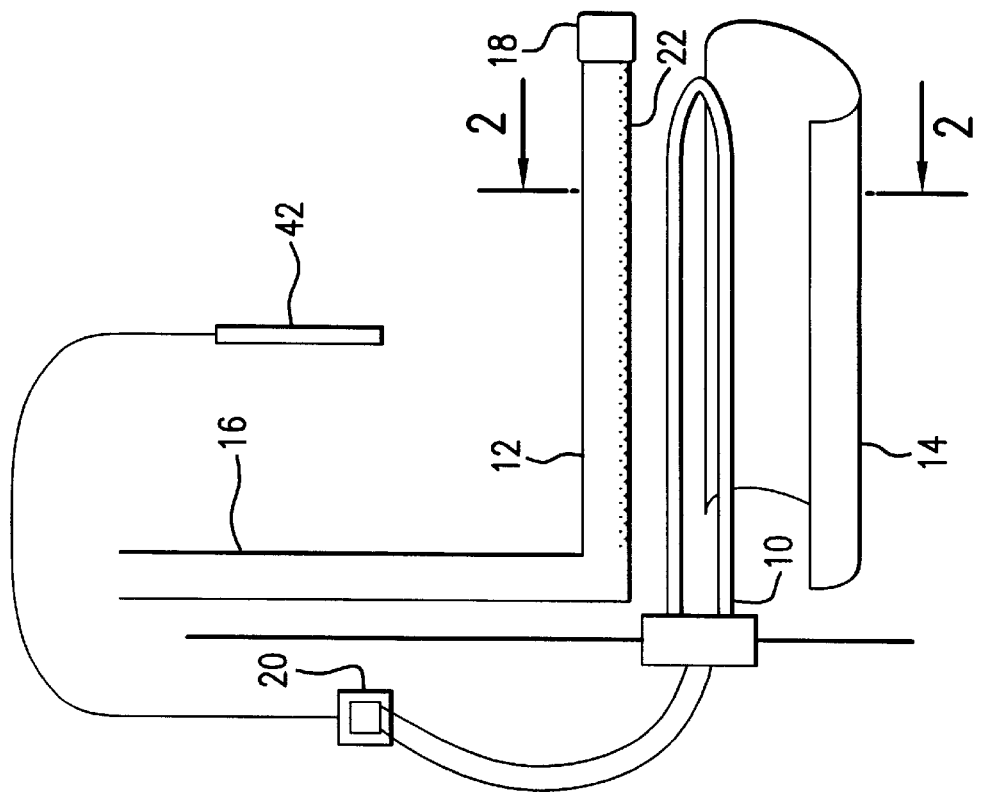

METHOD AND APPARATUS FOR PREVENTING SCALE BUILDUP ON ELECTRIC HEATING ELEMENTS

FIELD OF THE INVENTION

This invention is an improvement for heaters or boilers using electric heating elements that are submerged in an aqueous fluid being heated, such as water or a chemical process stream. It provides means for minimizing the formation of scale on the surface of such heating elements. It is particularly applicable to electric hot water heaters, but may be used for industrial fluid heaters using electric heating elements as well.

BRIEF DESCRIPTION OF THE PRIOR ART

Fluid heaters are generally known in residential and industrial use. In water heaters, a tank is generally provided, having an inlet for cold water and an outlet for heated water. In gas- or oil-fired heaters, the bottom of the tank is heated by combustion. In electric heaters, one or more heating elements is mounted within a tank. Such heating elements are intermittently energized by electric current controlled by a thermostat to maintain the fluid at a designated temperature.

The problem of scale buildup in heating tanks is ages old. In combustion heaters, scale tends to form as a sludge at the bottom, where the fire supplies the heat. Current expedients to control the buildup of such deposits include efforts to keep water in the tank agitated, sometimes described as a "hydroswirl" feature. For example, U.S. Pat. No. 4,838,211 shows a vertical circular water heater with gas heat applied from the bottom of the tank. Within the tank near the bottom is a circular pipe ring; the ring carries pumped water in a closed loop coming from the top of the boiler. The water in turn exits the pipe ring through a series of holes facing upward and inward so as to produce a swirling action in the entrained water. The pump is driven from an external source and is switched on when heated water is extracted for use. Water movement within the boiler is said to prevent accumulation of scale and other solid particles in the bottom portion of the water heater.

Similarly U.S. Pat. No. 4,790,289 discloses a pump and circulating pipe external to a water heater. The pump moves water from the top of cylindrical heater to the lower portion. The moving water is said to keep sediment or lime from building up on the bottom head of the tank and to prevent temperature stratification in the vertical tank.

U.S. Pat. No. 4,898,124 shows a circular plastic tube provided with perforations around the inner surface of the periphery. The circular tube is attached horizontally to the side wall of a water heater near the bottom of the tank. By ejecting water at an accelerated velocity through the perforations, scale from the bottom of the tank is said to be brought into suspension and carried out with the flowing water.

The prior art teachings address the problem of deposits forming at the bottom of heater tanks, but fail to deal with the buildup of scale on electric heating elements having an elongated rod-like shape within the tank. When a tank with the conventional "hydroswirl" feature contains an electric heating element, scale builds up on the heating element nevertheless.

SUMMARY OF THE INVENTION

The present invention provides an improved heater for fluids, comprising a tank having an inlet pipe for unheated fluid and an outlet pipe for heated fluid and an elongated electric heating element within the tank, wherein the improvement comprises means for directing a jet of fluid from the inlet pipe onto substantially the entire length of the electric heating element, thereby minimizing the buildup of scale on the heating element before it hardens thereon. The means for directing a jet of fluid desirably comprises a portion of the inlet pipe disposed parallel to the heating element and having an opening for fluid therein which is directed towards the electric heating element. In preferred embodiments, the opening comprises a multiplicity of perforations, the perforations being adapted to direct jets of fluid towards the vicinity of the electric heating element. The present invention applies to heaters and boilers for water and industrial aqueous fluids such as chemical process streams.

In some embodiments, a deflector is disposed opposite the electric heating element from the aforesaid portion of the inlet pipe, the deflector being adapted to redirect the jet of fluid toward the heating element and thereby improve the turbulent scrubbing action at the heating element.

In some embodiments, an induction coil or a permanent magnet is provided on the inlet pipe. When a coil is used, it desirably carries an electrical waveform supplied by an electronic descaling unit as described in pending U.S. patent application Ser. Nos. 08/544,156 and 08/601,553, the disclosures of which are incorporated herein by reference.

The present invention also provides a method for minimizing buildup of scale on an electric heating element in a hot water tank, comprising the step of directing a jet of water onto the heating element when water is added to the tank, while the building-up scale is still soft. Optionally, this is preceded by the step of pretreating water being added to the tank by subjecting the water to electronic descaling as it passes through an inlet pipe, such that the scale forming on the heating element becomes even softer than it would be in the absence of such treatment and thus easy to be removed.

Furthermore, the present invention provides a method of retrofitting a fluid heater to minimize scale buildup on an electric heating element therein. Such a heater comprises a tank having an inlet pipe for unheated fluid and an outlet pipe for heated fluid, plus an electric heating element within the tank. The retrofitting would comprise the step of:

A. Providing an extension of the inlet pipe that is parallel to the electric heating element and terminates in the vicinity of the heating element and that has an opening adapted to direct the unheated fluid towards the heating element.

Optionally the retrofit may also include a step of providing a deflector on the side opposite the heating element from the inlet extension pipe, containing the aforementioned perforations. Moreover, the retrofit would desirably include the step of using an induction coil or permanent magnet on the inlet pipe, to produce soft scale for easy removal from the surface of the heating element. Such an induction coil would be adapted to deliver to the fluid in the pipe solenoid-induced molecular agitation generated by an electronic descaling unit.

Scale Formation in Hot Water Heaters

Conventional electric hot water heaters generally employ an elongated electrical heating element of the type commonly known as "calrod." Such elements generally contain a resistance wire that is encapsulated within a metallic rod-shaped sheath of approximately ¼ inch diameter. For convenience in supplying electric power to both ends of the element, the the rods are generally bent so that the ends are adjacent. Commonly they are U-shaped; alternatively some such elements have an additional bend so that four substantially parallel arms are adjacent each other, which may be described as "W-shaped." Another alternative would be the configuration that is common in dishwashers, wherein the elongated element is bent to form the major portion of a circle, essentially "Omega-shaped."

The usual electrical heating element transfers heat energy at the density of 300 watts per square inch (compared to heating plates at the base of a usual gas-fired water heater, which transfer heat at about 30 to 50 watts per square inch). When the heating element of an electric water heater is energized, the temperature at its surface rises, for example to 200° F. As a result of the temperature rise, mineral ions in the vicinity of the element, such as calcium and magnesium, come out of solution in response to the altered equilibrium conditions, in the form of calcium and magnesium salts. These mineral salts tend to deposit on the surface of the heating element. This deposit is referred to as scale.

Initially the scale builds up as a soft deposit, but within a short period the scale stabilizes and hardens. This layer of scale developing on the surface of the heating element has a deleterious effect. Under the scale, the temperature of the heating element rises to damaging levels, e.g. over 400° F. This shortens the element's life, requiring premature replacement.

Removing the Scale

The present invention makes use of incoming water or other fluid to remove the scale while it is forming and the deposited scale from the previous heating cycle before it can harden. In accordance with the present invention, a jet of incoming fluid is directed at the surface of the heating element, dislodging the depositing scale while it is still soft. In one embodiment of the invention, a perforated pipe guides incoming water directly onto the heating element, where the jets of water impinge on the element, dislodging the scale.

In a preferred embodiment, the incoming fluid is pretreated by electronic descaling, with the effect of removing some of the calcium ions from solution and producing a softer scale on the heating element, thereby facilitating removal by a jet of incoming fluid. Prior electronic descaling technology is described in various sources, including U.S. Pat. Nos. 4,865,748 and 4,326,954, the disclosures of which are incorporated herein by reference.

Deflector

In a preferred embodiment of the invention, a deflector is installed near the heating element opposite from the incoming water pipe to assist in scale removal. The deflector causes the water movement to envelop the heating element on all sides. The deflector is shaped to cause the water to flow toward the heating element, thus improving the scrubbing action of the directed water flow.

The assembly of a heating element, perforated pipe and deflector can be retrofitted into an existing hot water tank or the like to improve its performance. By so doing the troublesome accumulation of scale on the heating element can be curtailed.

It is an advantage of the present invention that by limiting scale buildup on the electric heating element of an existing water heater or boiler, the life of the heating element is significantly extended. The retrofit of the present invention into an existing water heater provides extended life for the heating element, eliminating down time and cost for replacement.

BRIEF DESCRIPTION OF THE DRAWINGS

FIG. 1 is a schematic view in partial cross-section and partial perspective showing various elements of an embodiment of the present invention.

FIG. 2 is a cross-sectional view taken along the line 2—2 of the embodiment shown in FIG. 1.

DESCRIPTION OF PREFERRED EMBODIMENTS

Figure 3:
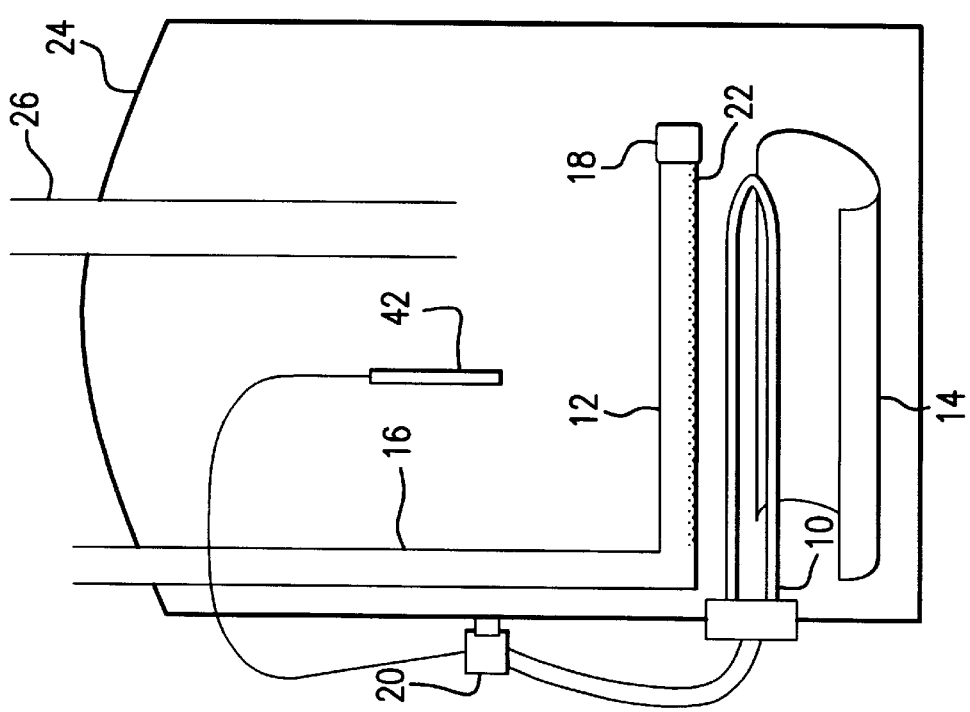
FIG. 3 is a schematic view of the apparatus of FIG. 1 within a hot water tank.

FIGS. 1 through 3 show a preferred embodiment of the present invention. A heating element 10 and a perforated pipe 12 are located in a water tank 24, such as is used to provide hot water in a residential or commercial location. Such tanks are well known, as shown in U.S. Pat. Nos. 4,527,543 and 4,447,377.

When hot water is withdrawn from the tank 24, cold water enters through water inlet 16, and the temperature within the tank drops, sensed by a sensor 42, which signals "on" a thermostatic control 20 to which it is connected. This delivers electrical energy to heating element 10.

The hot heating element 10 causes a temperature disequilibrium in the immediate vicinity of the surface of heating element 10. As a result, calcium and magnesium carbonates and other dissolved salts come out of solution; these are attracted to the surface of the heating element 10 by electrostatic force. If left undisturbed, this accumulation of scale material hardens and stabilizes on the heating element 10 and becomes difficult to remove.

The buildup of such scale acts to thermally insulate the heating element 10 from the surrounding water. This causes slower heating in the tank, and a rising temperature within the element. The results are slower recovery of an emptied tank to its desired operating temperature, and permanent damage to the heating element 10 when the internal temperature of the element approaches or exceeds the melting temperature of any of the components of the heating element.

The present invention corrects this problem by removing a great proportion of the scale while it is forming. In a preferred embodiment the invention uses a pipe 12 with multiple perforations 22 along its length, terminating at a closed end 18. The pipe 12 is closely located alongside the heating element 10. Cold water is introduced through inlet 16 when hot water exits from the tank 24 through hot water outlet 26. The cold water moves through the pipe 12 and exits through the multiplicity of perforations 22 and impinges on the full length of the heating element 10. These exiting water jets 13 scrub the surface of the heating element 10, removing the deposited scale attached thereto.

Deflector

The effectiveness of the scale removal is directly related to the forcefulness of the water circulation around the heating element. To improve the amount and force of the water turbulence, a deflector (here deflection panel 14) is preferably employed in accordance with the present invention, located adjacent to the heating element 10 but positioned opposite the water jets 13 from the perforated pipe 12. The deflected jets of water 15 (which were deflected by deflection panel 14) circulate back toward the surface of the heating element 10 providing additional water motion. The result is a more effective scrubbing action and better removal of the scale.

More specifically, the heating cycle begins when hot water is removed from hot water outlet 26. At that time pressure in the tank 24 is reduced and the cold water inlet 16 admits cold water to the perforated pipe 12. The cold water entering reduces the temperature in the tank, as sensed by a sensor 42 which triggers thermostat 20 "on," applying electrical energy to the heating element 10. The cold water exits through perforations 22 and impinge on the heating element 10.

The heat from the heating element 10 causes the temperature of the immediately adjacent water in the tank 24 to rise. Calcium and magnesium ions drop out of solution as a result and adhere to the surface of the heating element 10. However, the jets of water 13 directed toward the heating element 10 flush away the scale material that is forming on the heating element 10. The water flow proceeds past the heating element 10 and approaches the deflection panel 14 and is there returned as deflected water flow 15. The deflected water flow 15 then flushes the heating element 10 surface on the opposite face from that which was impinged upon by the direct jets 13.

In another embodiment of the invention, a deflector may be omitted. In this embodiment the jets 13 from the perforated pipe 12 provide the scrubbing action on the surface of the heating element 10.

As shown in FIG. 3, the heating element, perforated pipe, and the deflection panel assembly are horizontally located near the bottom of the water tank. The water inlet 16 is at the top of the tank 24, and the perforated pipe 12 extends downwardly therefrom. The perforated pipe is L-shaped.

In another embodiment (not shown) the heating element, perforated pipe, and the deflection panel assembly may be vertically located in the water tank. In that event, the inlet pipe would be I-shaped (with the perforated portion extending downwardly from the inlet) or J-shaped (with the perforated portion extending upwardly), if the water inlet is at the top of the tank.

In still another embodiment the heating element, perforated pipe, and the deflection panel assembly may be at the side wall of the tank. No specific location or orientation of the heating element, perforated pipe, and deflection panel assembly limits the performance of this invention.

Figure 4:
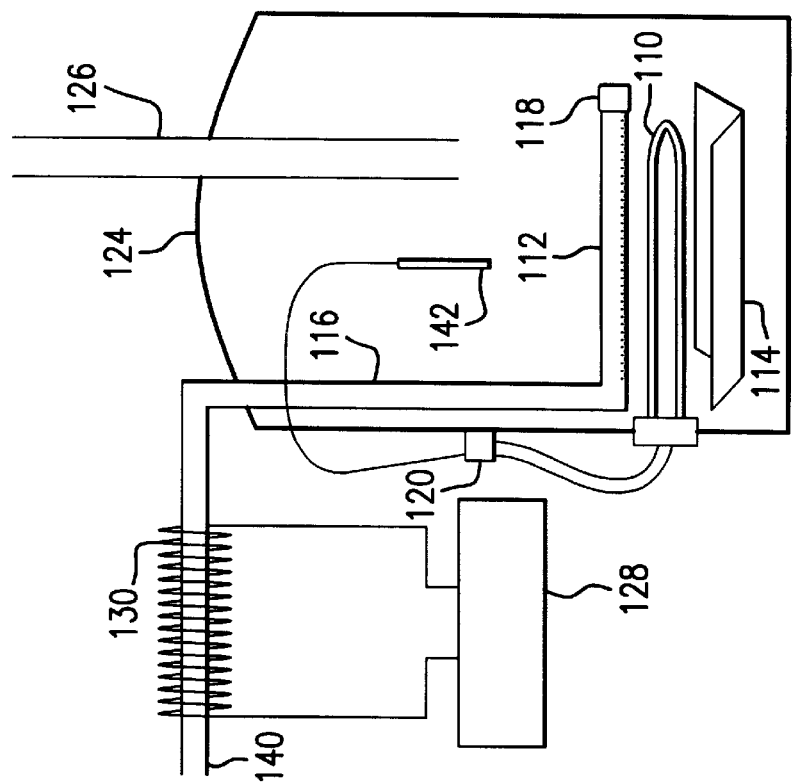
FIG. 4 is a schematic view in the nature of FIG. 1 of an alternative embodiment using electronic descaling on the inlet pipe of a fluid heater.

The shape of the deflector may be chosen from among many shapes. For example, it may be flat, or it may be triangular (as shown in FIG. 4) or cylindrical in cross-section. An alternative curved shape may be in the form of a hood (not shown). The removal of scale will take place regardless, by virtue of the jet streams 13 emitted by the perforated pipe and deflected jet streams 15, albeit at different rates. The deflection panel may be made of metal such as stainless steel or copper, or one of several varieties of polymer plastic.

The heater, perforated pipe, and deflector assembly can be located at the bottom of the tank, halfway up on a side wall, or mounted on a support bracket, or near the top of the tank. No specific position of the assembly should be interpreted as exclusionary.

As a retrofit, a perforated water pipe is installed into an existing hot water boiler or heater.

Simultaneous Use of Water Jet and Electronic Descaling Technology

FIG. 4 shows an embodiment of the present invention using electronic descaling. An electronic descaling unit 128 such as mentioned above supplies electrical energy in appropriate waveforms to a solenoid 130 wrapped around (or otherwise positioned to create an electromagnetic field in) the fluid supply pipe 140. The fluid supply pipe 140 is connected to fluid inlet 116 of the heater tank 124. Also shown are the hot water exit pipe 126 and a triangular deflector 114. Corresponding elements in the tank 124 shown in FIG. 4 are numbered by adding 100 to the reference numerals shown in FIG. 3.

This embodiment uses an electronic descaling process through which the liquid is treated before it enters the tank where the heater assembly operates. The incoming fluid passes through fluid supply pipe 140 before it enters the tank 124 through inlet 116. In the fluid supply pipe 140 the induced electric field generated by the solenoid 130 driven by electronic descaling unit 128 treats the liquid within the inlet pipe and causes some of the mineral ions in the fluid to form insoluble mineral salt crystals. After treatment the substantially treated fluid moves into the perforated pipe 112 within the tank 124. The treated fluid produces distinctively soft scales on the heating element, which can easily be removed by a jet of fluid.

Alternatively, the pretreatment of the fluid can be performed by substituting a permanent magnet (not shown) for the electronic descaling unit and induction coil, configured for example such as is described in U.S. Pat. Nos. 2,652,925 or 3,228,878, incorporated herein by reference.

Having thus described the invention, what I wish to protect by Letters Patent and hereby claim is:

1. A method for decreasing scale buildup on an electrical heating element in a heater tank, the heater tank having a fluid inlet pipe, the method comprising the steps of:

extending the fluid inlet pipe proximate the electrical heating element;

providing a plurality of apertures in the inlet pipe pointing towards and along the length of the heating element;

directing jets of fluid from the apertures to the surface of the heating element with sufficient force to dislodge at least a portion of the scale that may have accumulated on the electrical heating element; and locating a deflector adjacent to the electrical heating element and positioned opposite said apertures in the extended fluid inlet pipe for deflecting at least a portion of the jets of fluid that pass the heating element back towards the heating element, thereby increasing turbulence in the heater tank proximate to the heating element.

2. The method of claim 1 further comprising the step of providing an electronic descaling unit that communicates with the fluid inlet pipe for generating an electromagnetic field within the fluid inlet pipe.

3. The apparatus of claim 2 wherein said electronic descaling unit includes an induction coil on said inlet pipe.

4. The method of claim 1 further comprising the step of providing a permanent magnet proximate the fluid inlet pipe for creating a magnetic field in the fluid inlet pipe as the fluid enters into the heating tank.

* * * * *